H. PEMBERTON.
Making Alkalies.

No. 22,888.  Patented Feb. 8, 1859.

Witnesses:
Geo. W. Donohue
Chas. W. Body.

Inventor:
H. Pemberton

UNITED STATES PATENT OFFICE.

HENRY PEMBERTON, OF EAST TARENTUM, PENNSYLVANIA.

PROCESS OF MANUFACTURING CAUSTIC ALKALIS.

Specification of Letters Patent No. 22,888, dated February 8, 1859.

*To all whom it may concern:*

Be it known that I, HENRY PEMBERTON, of East Tarentum, in the county of Allegheny and State of Pennsylvania, have invented a new and useful Improvement in the Process of Manufacturing Caustic Soda and other Caustic Alkalis; and I do hereby declare the following to be a full, clear, and exact description thereof, reference being had to the annexed drawing, forming part of this specification, in which—

Figure 1:
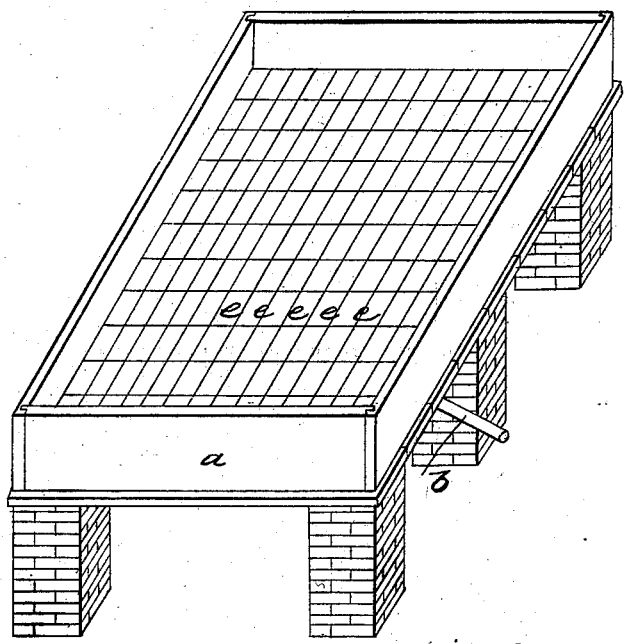
Figure 2:
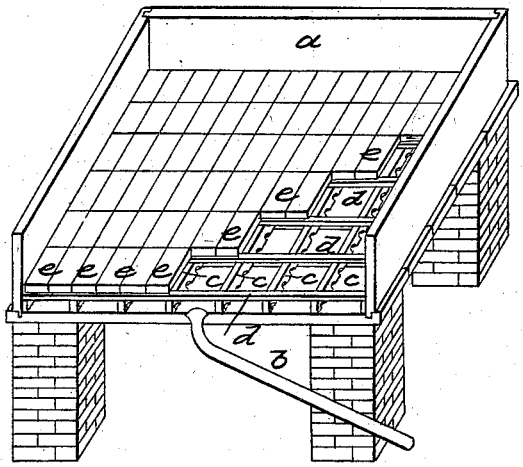
Figure 3:
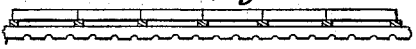

Figure 1, is a perspective view of the improved filter which I use in my process. Fig. 2, is a sectional view thereof.

My invention consists in the mode hereinafter described of separating the solution of caustic soda or other caustic alkalis from the carbonate of lime or other precipitate in the process of manufacture, by filtration through fire brick or other porous substance capable of resisting the caustic action of the alkaline liquid, whereby a more perfect separation is effected than by the process heretofore known and employed; and a great saving in time and fuel is attained by avoiding the dilution of the liquid and thereby lessening greatly the amount of evaporation requisite to produce the solid caustic soda.

To enable others skilled in the art to make use of my improved process, I will proceed to describe it fully, together with the construction and operation of the improved apparatus which I employ.

The process of manufacturing caustic soda consists in treating a solution of carbonate of soda, with hydrate of lime in excess; the result of which is the separation from the carbonate of soda, of the carbonic acid, which, uniting with the lime in the form of insoluble carbonate of lime, is precipitated, and leaves the solution of caustic soda. This solution of caustic soda is decanted from the precipitated carbonate of lime, and is reduced by evaporation to a solid state.

In order to insure the entire removal of the carbonic acid from the soda, it is necessary to use a quantity of lime considerably greater than the amount of soda in the solution under treatment, so that after so much of the solution of caustic soda has been removed as can be done by the process of decanting, there yet remains a large amount of solution of soda, mixed with the precipitated carbonate of lime, in the bottom of the vessel, forming a pulpy mass which requires further treatment to extract the caustic soda, and leaves the pure carbonate of lime.

By the ordinary process of manufacture this caustic soda is separated from the residuum by adding to it, water nearly equal in quantity to the original solution, mixing it thoroughly with the precipitated carbonate of lime, and then leaving it to settle. The water makes a weak solution of caustic soda, separating it from the lime, from which it is decanted, and the process of washing is repeated, then or twelve times, until all the caustic soda is removed. These weak solutions must be evaporated, until the solid caustic soda is procured, otherwise a large quantity of the caustic soda would be lost. By this process it is difficult to extract all the soda from the mass of lime, and the quantity of liquid to be evaporated, becomes enormously great, even when the dilute solutions are used in place of fresh water to wash out the stronger solutions first obtained.

The process of filtration of the solution of caustic soda through matting, or some cotton, linen, or woolen fabric might in some degree, overcome this difficulty, were it not that the caustic soda is so extremely corrosive that it immediately attacks and rapidly destroys any textile fabric with which it comes in contact, rendering them entirely unsuitable for that purpose, and even a filter composed of sand or other similar substance, would require renewal after each operation, and would be very difficult, if not impossible, to construct and keep in order; another great difficulty would be that a large amount of solution of soda would still be left by capillary attraction, among the particles of lime.

By my invention, I have entirely surmounted all these obstacles to the successful use of filtration for the separation of the caustic soda from the residuum of carbonate of lime. This I accomplish by passing the solution of soda after it is mixed with the hydrate of lime (as stated in the commencement of this specification) through a filter made of bricks or tiles of fire clay, or other similar material. The construction of my filter is seen by reference to the annexed drawings.

In Fig. 1, *a* is a shallow tank or pan, constructed of wood, stone, brick or other suitable material, about eighteen inches in depth, and of any required length and width (say twenty-five feet by forty which is a convenient size). This tank is made water tight and is supported on a wall or props. The bottom of this tank is not quite level, but inclines from the sides all around toward a hole in the center or some other point, from which a pipe *b*, conducts the filtered liquid to a cistern or other receptacle. On the bottom of this tank are placed a number of joists *c*, *c*, *c*, placed parallel to each other across the vessel about twelve inches apart. These joists need not be more than one inch thick, and two or three inches in height, and have a number of holes bored close to their lower edge, to allow the liquid to pass through to the exit pipe *b*. Across these joists *c c* are placed strips of wood, *d*, *d*, about an inch square, and distant from center to center, the length of the fire brick or tile, to be laid on them. The tile or brick to be used is made of fire clay, or other similar and suitable material, consisting essentially of a difficultly fusible siliceous clay or sand, united into a mass by partial vitrification, or the reciprocal action of the silicates upon each other. These tiles or bricks *e* are laid flat, side by side, care being taken to cover the ends of the tiles, wherever they touch each other, or the sides of the tank, with a thin mortar of hydraulic cement mixed with water to the consistence of cream, with or without sand, so as to leave no interstices between the tiles, themselves, nor between the tiles and the sides of the tank through which any liquid matter could pass. When the mortar has set, the tiles form a firm floor, which can be walked upon without fear of injuring it. It might be supposed, that a filter thus constructed would be impervious to any fluid except under high pressure, but actual experiment has proved it to be precisely adapted to the use for which it is designed.

I make use of my filter as follows: The solution of caustic soda is prepared as before stated by treating carbonate of soda with hydrate of lime in excess. The resulting carbonate of lime, having been allowed to precipitate; as much of the clear caustic liquor as possible, is drawn off. The precipitate is then well stirred up, and poured on to the filtering table, until it covers it to the depth of six or eight inches. The solution of caustic soda now filters rapidly through the tile composing the floor of the tank, and escapes by the pipe *b;* being thus separated without dilution from the lime which is left, when the flow of liquid ceases, on the filtering table, about three or four inches in depth, and of the consistence of thick mortar. Some of the solution of caustic soda still remains in the lime, which is now removed, without diluting the liquor, by the mere addition of as much pure water as there is liquid among the lime. When the solution of caustic soda ceases to run from the pipe, water is gradually run upon the mass of lime in the filter in successive quantities until it stands on the lime as deep as the thickness of the mass of precipitate; care being taken to pour the water on so gently as not to wash the lime, in any spot, so as to uncover the bricks. The water thus poured on the lime, and forming a stratum above it, now gradually displaces the solution of caustic soda mixed with the lime, forcing it through the tiles into the space below, whence it runs through the pipe, and will be found to be strong liquor undiluted by the water which now occupies its place. Thus the whole soda in solution is obtained, almost, if not entirely undiluted, while the precipitate is left in a nearly dry state, and ready to be shoveled away, dried, and used for other purposes, as carbonate of lime. The quantity of liquor to be evaporated is thus at least two thirds less than by the ordinary process of washing the precipitate with water, which saves not only the time and labor requisite to go through the process of evaporation of the greater quantity of liquor, but also saves a large amount of fuel; ascertained to be, in a manufactory making twenty five tons of caustic soda per week not less than ten tons of coal per diem. In addition to this, the advantage of extracting the soda perfectly from the precipitate, is very great, saving the labor of two or three men required, under the old process, to be employed to stir the liquid.

After the filters have been used for several months, the bricks composing the floor become partially choked, so that the process of filtration goes on less rapidly. When this is observed, they may be removed, and a new floor laid of new brick in the manner described; the old bricks after being washed are not at all injured for the purposes for which fire brick are ordinarily used; and thus the expense of renewing the filter is reduced to the mere cost of removing and replacing the floor.

It is manifest that the construction and arrangement of the parts of my filtering tank are susceptible of modification, without materially altering its mode of operation.

Having thus described my improvement in the manufacture of caustic soda and other caustic alkalis, what I claim as my invention and desire to secure by Letters Patent is—

The mode hereinbefore described of separating the solution of caustic soda or other caustic alkaline liquid from an insoluble precipitate by the use of a filter constructed substantially in the manner hereinbefore described.

In testimony whereof I have hereunto set my hand this twentieth day of October A. D. 1858.

H. PEMBERTON.

Witnesses:
 MARTIN G. CUSHING,
 N. BAKEWELL.